United States Patent [19]

Brown

[11] 4,164,781

[45] Aug. 14, 1979

[54] TRACK SERVOING SYSTEM USING SIGNALS FROM TUNNEL ERASE HEADS

[75] Inventor: Timothy R. Brown, Westboro, Mass.

[73] Assignee: Decitek, Worcester, Mass.

[21] Appl. No.: 895,393

[22] Filed: Apr. 11, 1978

[51] Int. Cl.² .................. G11B 5/02; G11B 21/10; G11B 5/27

[52] U.S. Cl. .............................. 360/77; 360/66; 360/118; 360/121

[58] Field of Search ............... 360/77, 118, 121, 122, 360/125, 119, 66

[56] References Cited

U.S. PATENT DOCUMENTS

| | | | |
|---|---|---|---|
| 3,246,307 | 4/1966 | Stanley | 360/77 |
| 3,541,270 | 11/1970 | Walther | 360/77 |
| 3,852,812 | 12/1974 | Reisfeld | 360/118 |
| 4,055,849 | 10/1977 | Hickok | 360/121 |

*Primary Examiner*—Alfred H. Eddleman
*Attorney, Agent, or Firm*—Oblon, Fisher, Spivak, McClelland & Maier

[57] ABSTRACT

A track servoing system is disclosed which is particularly useful with floppy disk memories. The system improves the positioning accuracy of a read/write head during a reading operation through the use of tunnel erase heads as read heads. The tunnel erase heads are positioned on either side of the read/write head and their outputs are differentially measured to provide direction and magnitude information to servo positioning electronics. The invention is particularly reliable in reading eccentric variations in data tracks caused by environment, i.e., humidity, temperature, etc.

7 Claims, 2 Drawing Figures

TRACK SERVOING SYSTEM USING SIGNALS FROM TUNNEL ERASE HEADS

BACKGROUND OF THE INVENTION

1. Field of the Invention

This invention relates generally to servoing systems, and more particularly to an improved servoing system for use in positioning read/write heads in magnetic recording or reproducing equipment.

2. Description Of The Prior Art

An important design consideration in magnetic memory systems, especially floppy disk drives, is that the recording medium (diskettes) produced by one manufacturer's equipment may be read by another manufacturer's equipment. In order to meet this requirement clean recording tracks are required. Typical read/write head construction for use in floppy disk drives accordingly utilizes either tunnel or straddle erase techniques to remove fringe flux patterns produced by the write head during a write operation in order to provide clean tracks to accomplish the purpose of record compatibility. The tunnel or straddle erase heads are generally a single coil wrapped on a yoke that spans the read/write core. This technique produces tracks of information that are typically 0.012 inches wide with 0.0088 inch gaps of erased area between the tracks.

In view of the extremely fine spacing between the tracks perfect alignment of the read head is normally somewhat difficult to maintain. Misalignments may be caused, for example, by mechanical tolerances, temperature changes, hygroscopic expansion of the recording medium and other phenomena. Thus a need exist for an improved read head servoing system which can follow a track of recorded information with extreme accuracy, particularly in the environment of a floppy disk drive.

Systems of this type have been disclosed in the past, for example in U.S. Pat. No. 3,246,307, issued Apr. 12, 1966 to C. B. Stanley which describes a servo positioning system for use with a magnetic disk file. The device disclosed in this patent includes a unique read/write head structure comprised of three separate elements, one writing element and two separate reading heads, each about $\frac{1}{3}$ the width of the recorded track. A second disclosed embodiment in the patent utilizes a read/write head having two separated magnetic elements. While the system described in the Stanley patent is functional in some environments, it is not satisfactory for accurate fine positioning of a read/write head in a floppy disk drive system. In particular, the fine position servo of the Stanley patent is used only for initial fine positioning of the read/write head. Once positioning is completed, the servo is disconnected for the remainder of the read operation. Due to the nature of the floppy disk medium however, it is important that fine position servoing be continued throughout any read operation. Furthermore, the compatibility requirement, previously mentioned, could not be obtained by the Stanley apparatus because it contains no tunnel or straddle erase heads to erase fringe flux reversals at the sides of the recorded track. In addition, the use of multiple, relatively narrow read head elements in the Stanley device reduces the signal-to-noise ratios obtainable by the disclosed system.

From the foregoing, it is believed apparent that an improved system for track servoing, particularly in conjunction with disk drives, is needed.

SUMMARY OF THE INVENTION

Accordingly, one object of the present invention is to provide a novel servoing system for use with magnetic recording and reproducing heads.

Another object of the present invention is to provide a novel track servoing system particularly adapted for use with floppy disk drives.

Yet another object of the present invention is a provision of a novel read/write head positioning system for use with recorded magnetic media having helical information tracks.

A still further object of the present invention is the provision of a novel control network for providing a track servoing system in combination with a read/write head including tunnel erase coils.

Yet another object of the present invention is the provision of a novel method of head servoing in a magnetic recording and reproducing system.

Briefly, these and other objects of the present invention are achieved by the use of a unique control circuit coupled to a read/write head having a pair of spaced tunnel erase heads which include individual cores separately wound. Switching circuitry is coupled to the erase heads to permit them to alternately serve an erasing function or a track sensing function. In the track sensing mode the erase heads produce signals which are combined in a phase inverted relationship so that they cancel when equal. If the head assembly is centered over a recorded information track, the outputs from the two heads are equal and cancel one another. However, if the center of the information track moves away from the head assembly, a net error signal is produced, integrated and fed to a head position servo to correct the position of the head assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BRIEF DESCRIPTION OF THE PREFERRED EMBODIMENTS

Figure 1:
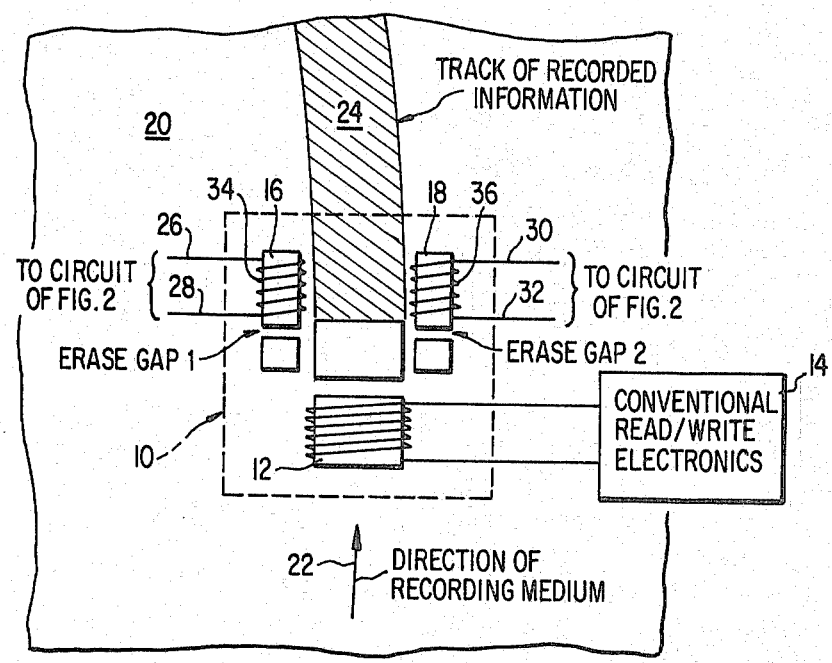
FIG. 1 is an illustration of the multiple function head assembly of the present invention; and, FIG. 2 is a schematic diagram of the circuit arrangement utilized in accordance with the present invention.

Referring now to the drawings, wherein like reference numerals designate identical or corresponding parts throughout the several views, and more particularly to the FIG. 1 thereof, the multiple function head arrangement of the present invention is designated by reference numeral 10. The multiple head 10 includes a conventional read/write head 12 connected to conventional read/write electronics 14. Adjacent either side of the read/write head 12 are two tunnel or straddle erase heads 16 and 18, respectively. The erase head 16 is shown as including Erase Gap 1 while the erase head 18 is shown as including Erase Gap 2. The erase heads cooperate with a recording medium 20, such as a conventional diskette of the type used with a floppy disk drive, driven in the upward direction in FIG. 1 as designated by an arrow 22. A typical recorded information track is shown at 24. The erase heads 16 and 18 each comprise an erase coil 34 and 36 respectively, wound about a suitable core. The control leads 26, 28, 30 and 32 of the erase heads 16, 18 are connected from the respective erase coils 34, 36 to the circuit illustrated in FIG. 2.

Figure 2:
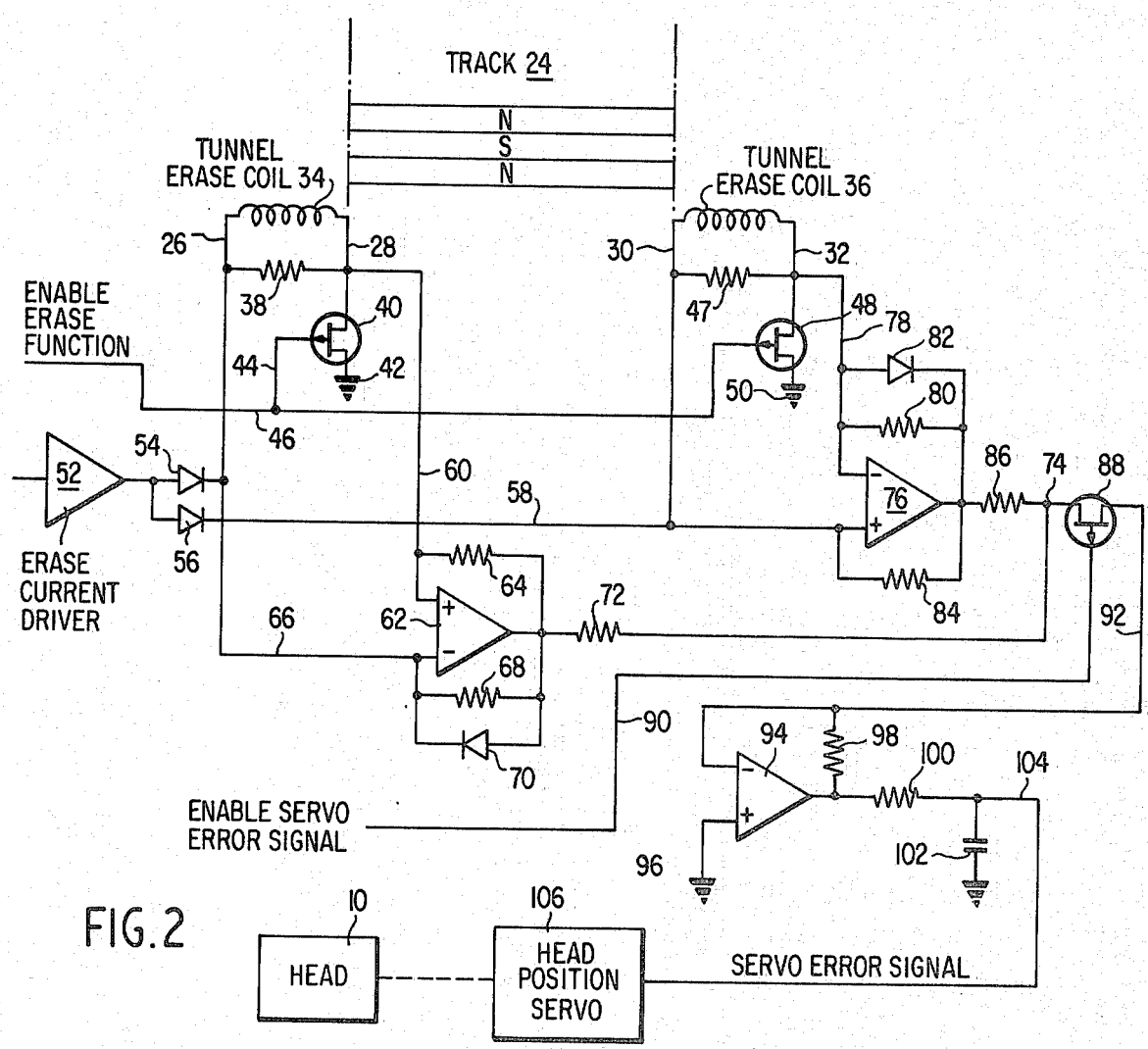

Referring now to FIG. 2, the details of the circuit of the present invention are schematically illustrated. More particularly, the erase coil 34 is shown as having a resistor 38 coupled across its control leads 26 and 28. The control lead 28 is further coupled to the drain of a field effect transistor (FET) 40, the source of which is coupled to a suitable reference potential such as ground, as indicated at 42. The gate of the FET 40 is coupled via a line 44 to an enable erase function line 46.

Similarly, the control line 32 of tunnel erase coil 36, which has a resistor 47 connected across it, is coupled to the drain of an FET 48, the source of which is coupled to a reference potential such as ground, as indicated at 50. The gate of FET 48 is also coupled to the line 46.

The control line 26 of tunnel erase coil 34 is coupled to the output of an erase current driver amplifier 52 through a protective diode 54, while the control line 30 of tunnel erase coil 36 is similarly coupled to the output of the amplifier 52 through a second protective diode 56 via a line 58.

The control line 28 of tunnel erase coil 34 is also coupled via a line 60 to the positive input of a differential amplifier 62. A feedback resistor 64 couples the line 60 to the output of the amplifier 62. The control line 26 of the tunnel erase coil 34 is coupled via a line 66 to the negative input of the differential amplifier 62, and also to a feedback resistor 68 and a clamping diode 70 which are coupled in parallel across the amplifier 62. The output of the amplifier 62 is fed through a summing resistor 72 to a summing point 74.

Tunnel erase coil 36 is coupled to a circuit which is substantially identical to, but phase inverted with respect to, the circuit of tunnel erase coil 34 just described. Specifically, the control line 32 of tunnel erase coil 36 is coupled to the negative input of a differential amplifier 76 via a line 78. A feedback resistor 80 and a clamping diode 82 are coupled in parallel between the line 78 and the output of the differential amplifier 76. The control line 30 of the tunnel erase coil 36 is coupled to the positive input of the differential amplifier 76, which is in turn coupled to the output thereof via a feedback resistor 84. The output of the amplifier 76 is coupled through a summing resistor 86 to the summing point 74.

The summing point 74 is connected to the drain of an FET 88, the gate of which is connected to an enable servo error line 90. The source of the FET 88 is coupled through a line 92 to the negative input of a differential amplifier 94. The positive input of the amplifier 94 is coupled to a reference potential such as ground, as indicated at 96.

A feedback resistor 98 is coupled across the input line 92 and output terminal of the amplifier 94, while an integrating network, comprising a resistor 100 and a capacitor 102, is coupled to the output of the amplifier 94. A line 104, connected to the junction of resistor 100 and capacitor 102, is coupled to a conventional head position servo 106 to provide the driving signal thereto. The head position servo 106 is coupled to the multiple function head 10 to physically adjust the head position.

OPERATION

The operation of the system of the present invention will now be discribed in detail.

During a write operation, an enable erase function signal on line 46 is driven low (e.g. 0 volts), turning on FETs 40 and 48, and erase current is simultaneously supplied by erase current driver 52. A DC erase current then flows through the tunnel erase coils 34 and 36 and the FETs 40, 48. The outputs of amplifiers 62 and 76 will then saturate and be opposite in polarity, causing a net signal of approximately 0 volts to be summed at the summing point 74. To insure that no error signals are induced into the head positioning system during the write mode, FET 88 is turned off by removing the enable servo error signal to line 90, thereby neutralizing the error signal to the head position servo 106.

During a read operation the erase current is cut off so that the erase current driver 52 supplies no output. The enable erase function signal is simultaneously switched high, turning off FETs 40 and 48. The enable servo error signal is brought low, turning on FET 88, which in turn permits the summed output of amplifiers 62 and 76 to be applied to amplifier 94 over line 92. The system is now in its track sensing mode and the servo positioning network is fully operational.

Flux reversals (denoted by N, S, N in the recorded track 24) are sensed by the coils 34 and 36 when in the track sensing mode and produce out-of-phase signals at the outputs of amplifiers 62 and 76 as the recording medium moves past the head 10. If the erase coils 34 and 36 are centered over the recorded track 24, the signals produced at the outputs of amplifiers 62 and 76 will cancel, and no error signal will be produced at the output of amplifier 94, regardless of the direction of flux reversals in the recorded track.

Let it be assumed that N-S flux reversals induce positive voltages left to right across the resistors 38 and 47. As the recorded track 24 moves to the right relative to the head 10, the voltage induced across resistor 47 will become larger than that induced across resistor 38. The output of amplifier 76 will be positive, and will increase in magnitude as the recorded track 24 moves further to the right. At the same time the output of amplifier 62 will be negative and will decrease in magnitude as the head 10 moves further out of alignment with the track 24. These signals will be summed at the junction of resistors 72 and 86 to produce an increasingly negative signal at the output of amplifier 94. This signal is integrated by the integrating network comprising resistor 100 and capacitor 102 to produce an error signal on line 104. The error signal drives the head position servo 106 until the head is centered over the track 24, whereby a null voltage is again induced at summing point 74.

S-N flux reversals are excluded from the operation of the illustrated circuit, as they would remove the energy stored in the integrator capacitor 102 and disable the operation of the circuit. These signals are removed by the clamping diodes 70 and 82. In this regard, it is noted that selection of flux reversal polarity need not be the case if additional absolute value circuitry is used in the initial detection stages. It would be apparent to those skilled in the art that circuitry of this type can easily be added to the apparatus as presently disclosed.

Circuit operation for excursions of the track to the left of the head 10 are the same as above, with the exception that the magnitude of the signal from amplifier 62 is larger than that from amplifier 76. Accordingly the polarity of the signal produced by amplifier 94 reverses and goes positive, so that the integrator network produces a positive error signal. This signal is delivered to the head position servo 106 to drive the head 10 in the opposite direction to again null the error voltage.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A position servo control system for a magnetic read/write head for maintaining said read/write head centered over a recorded information track comprising:
    erase head means positioned adjacent said read/write head for erasing spurious recorded signals on opposite sides of said information track when said read/write head is in a write mode,
    first electronic switching means coupled to said erase head means for switching said erase head means from an erasing mode to a track sensing mode, wherein said erase head means couples magnetic flux from said track; and,
    servo error signal generating means coupled to said erase head means for generating a signal proportional to the misalignment between said erase head means and said recorded information track based on the magnetic coupling between said erase head means and said track during the track sensing mode.

2. A position servo control system as in claim 1, wherein said erase head means comprises:
    a pair of tunnel erase heads including tunnel erase coils,
    said tunnel erase heads positioned directly adjacent said read/write head, and on opposite sides thereof.

3. A position servo control system as in claim 1, wherein said servo error signal generating means comprises:
    first and second differential amplifier means coupled to said erase head means for producing track edge position signals, said differential amplifier means coupled to said erase head means in a phase inverted manner with respect to each other,
    summing means coupled to said first and second differential amplifiers for comprising outputs thereof; and
    integrating means coupled to said summing means for integrating the net combined outputs of said first and second differential amplifiers.

4. A position servo control system as in claim 3, further comprising:
    second electronic switching means coupled between said summing means and said integrating means for selectively decoupling said summing means from said integrating means.

5. A position servo as in claim 4, further comprising:
    third differential amplifier means coupled to said integrating means for applying an input signal thereto.

6. A position servo as in claim 2, further comprising:
    means for supplying an erase current; and,
    wherein said first electronic switching means includes a pair of controllable semiconductor devices coupled to said tunnel erase coils for selectively permitting said erase current to flow through said tunnel erase coils.

7. A method for controlling read/write head assembly position in a magnetic disk drive system, wherein said read/write head assembly includes a pair of tunnel erase heads positioned on opposite sides of a read/write head, comprising the steps of:
    switching said tunnel erase heads from an erase mode to an information track sensing mode,
    driving a track of recorded information past said read/write head assembly,
    generating track edge position signals with said tunnel erase heads,
    combining said track edge position signals in a phase inverted relationship so that they cancel when equal, but do not cancel when unequal,
    integrating the net signal produced in said step of combining; and,
    using the signal produced in said step of integrating for controlling the position of said read/write head assembly.

* * * * *